UNITED STATES PATENT OFFICE.

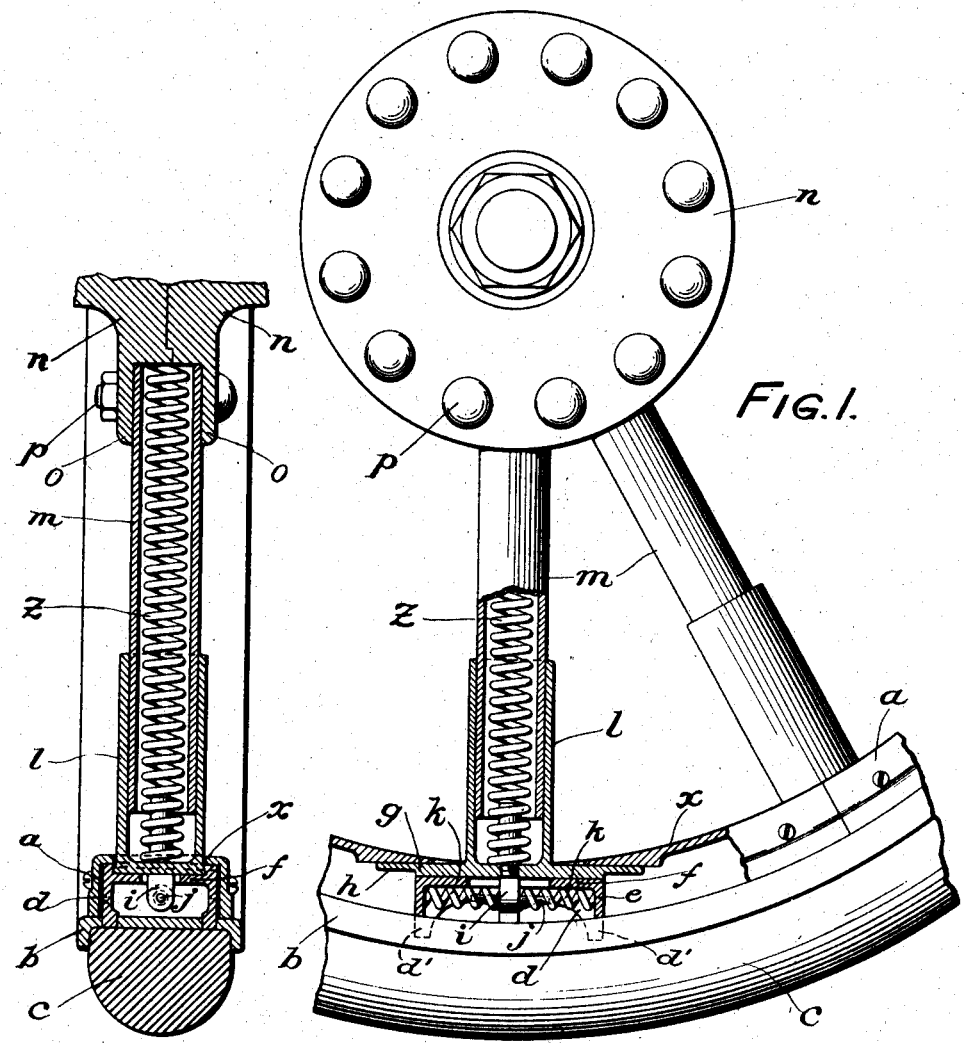

JOHN SINNOTT, OF PHILADELPHIA, PENNSYLVANIA.

VEHICLE-WHEEL.

No. 926,830.　　　Specification of Letters Patent.　　　Patented July 6, 1909.

Application filed February 10, 1906. Serial No. 300,359.

*To all whom it may concern:*

Be it known that I, JOHN SINNOTT, a citizen of the United States, residing at Philadelphia, county of Philadelphia, and State of Pennsylvania, have invented a new and useful Improvement in Vehicle-Wheels, of which the following is a full, clear, and exact description, reference being had to the accompanying drawings, which form a part of this specification.

In a patent issued to me May 15, 1906, No. 820,741, there is set forth a construction for vehicle wheels adapted to absorb shocks to the vehicle without the use of pneumatic or other similar tires, the said construction comprising inner shoes engaging and movable circumferentially relatively to outer shoes secured to the rim, and tubular spokes secured to the hub and engaging and movable radially relatively to the inner shoes, there being springs between the spokes and inner shoes and between the inner shoes and outer shoes adapted to yield to permit said movements and to restore the movable parts to their normal positions.

The present invention has for its object to improve the said construction and particularly to construct and arrange the rim and shoes so that the latter will be inclosed and protected by the rim and rendered dust proof.

In the drawings: Figure 1 is a detailed side elevation, partly in section, of a part of my improved wheel; Fig. 2 is a sectional view taken longitudinally through a spoke and transversely through the shoes, rim and tire.

The outer shoes are secured to a part $b$ of the rim that will be hereinafter designated the outer rim. The tire $c$ is secured to the outer rim $b$ in the usual way.

Each outer shoe comprises side flanges $d$, partly cut away; end flanges $e$; a slotted horizontal web $f$; and feet $d'$ extending through, and flush with the outside of, the rim. The side flanges are tapered inwardly and upwardly at their upper ends above the web $f$.

Each inner shoe comprises a flat plate $g$ having sides tapering downwardly and outwardly, the width and shape of the shoe being such as to fit within the shallow groove or guide formed by the web $f$ and side flanges $d$ of the lower shoe. The inner shoe is also provided with flanges $h$ overhanging its ends and with a central projection $i$ extending through and beneath the slot in the web $f$. Secured to the projection $i$ are pins $j$ projecting endwise therefrom. Surrounding pins $j$, and confined between the projection $i$ and the end flanges $e$ of the lower shoes, are the coil springs $k$.

The inner shoes also comprise radially inwardly extending hollow or tubular arms $l$ within which extend the tubular spokes $m$. The hub is made of two parts or sections $n$, $n$, abutting against each other, the said parts having annular flanges $o$, $o$, provided with complementary recesses forming a socket to receive the tubular spoke $m$. The spokes $m$ are held in place, and the two parts of the hub secured together, by means of bolts $p$ extending through the abutting flanges and arranged alternately with the spokes.

$z$ is a spring extending throughout each tubular spoke and abutting at its opposite ends against the hub and the part $g$ of the inner shoe.

The connection described between the inner shoes and the hub is specifically the same as that set forth in my said prior application.

The remaining part of the rim, which I call the inner rim, and which is made in sections consists of side flanges $a$ adapted to rest within and upon the outer rim $b$ and bolted to the outer shoes, and a web $x$ connecting the inner ends of the side flanges. This web is cut away to accommodate the tubular arms $l$ of the inner shoes and also to leave a space in front and back of the tubular arms $l$ to permit the inner shoes to slide circumferentially, or more accurately, at right angles to the radius in the plane of the wheel. The inner rim thus overhangs the inner shoes at their ends to permit the inner shoes to slide upon the inner rim as well as upon the outer shoes. The part of the web $x$ of the inner rim overhanging the ends of the inner shoes is thickened, and flattened on its under face, so as to maintain at all times the proper sliding fit between the inner rim and inner shoes.

In practice, the spokes of the wheel ride backward or forward with relation to the rim in a circumferential direction dependent upon the point of application of force upon the rim, the shoes sliding relatively upon each other in a longitudinal direction against the pressure of one spring or the other, and the inner shoes and inner rims also sliding longitudinally upon each other. At the same time, the part of the rim to which force is applied moves inwardly toward the hub by reason of the sliding connection between the spokes and the inner shoes, this relative movement of rim and hub being against the pressure of the springs within the spokes. The construction and arrangement of shoes and inner rim substantially conceals the shoes from view and effectively protects the shoes from dust. The inner rim may be made of aluminum in order to lighten the structure as a whole.

Having now fully described my invention, what I claim and desire to protect by Letters Patent is:

1. A vehicle wheel comprising a hub, spokes, a rim, shoes secured to the rim, shoes carried by the spokes and engaging both the first named shoes and the rim, and means permitting the last named shoes to move longitudinally with respect to both the first named shoes and the rim.

2. A vehicle wheel comprising a hub, an outer rim and an inner rim secured together, inner and outer shoes within the rims, the former being carried by the spokes and the latter being secured to one of the rims, guides on one of each pair of shoes along which the other shoe is slidable longitudinally, and a flexible connection between the two shoes of a pair tending to maintain them in normal relation.

3. A vehicle wheel comprising a hub, an outer rim, outer shoes secured thereto, an inner rim secured to the outer shoes, inner shoes slidable upon the outer shoes, a flexible connection between the two shoes of a pair, and spokes connecting the inner shoes and the hub.

4. A vehicle wheel comprising a hub, spokes radiating from the hub, a hollow rim, shoes inserted in the rim and secured thereto, other shoes extending within and engaging the rim and first-named shoes and movable circumferentially with respect to the rim and also movable radially with respect to the spokes, flexible connections between the last-named shoes and the spokes tending to maintain the hub central to the rim, and flexible connections between the two sets of shoes tending to maintain them in normal relation.

5. A vehicle wheel comprising a hub, spokes radiating from the hub, a hollow rim, inner shoes extending within the rim, outer shoes within the rim and secured thereto and engaging and movable longitudinally along the inner shoes, springs between the outer and inner shoes, arms on the inner shoes engaging the spokes and slidable radially relatively thereto, and springs between the inner shoes and the spokes.

6. A vehicle wheel comprising a hub, tubular spokes secured thereto, inner shoes, arms on the inner shoes engaging and slidable radially with respect to the spokes, springs between the spokes and the inner shoes, extending within the tubular spokes, a rim engaging and movable upon the inner shoes, outer shoes secured to the rim and engaging and movable circumferentially with respect to the inner shoes, and springs between the inner and outer shoes.

7. A vehicle wheel comprising an outer rim member, outer shoes secured thereto, inner shoes movable longitudinally along the outer shoes a flexible connection between the two shoes of a pair, a sectional inner rim member substantially inclosing both the inner and outer shoes and slidably engaging the inner shoes, a hub, and spokes by which the inner shoes are sustained.

8. A vehicle wheel comprising a rim, outer shoes secured thereto, said outer shoes each having a connecting web and side flanges extending above the web, inner shoes adapted to rest upon the webs of the outer shoes and between said side flanges and movable longitudinally along the outer shoes between said side flanges a flexible connection between the two shoes of a pair, a hub and spokes connected with the inner shoes and the hub.

9. A vehicle wheel comprising a rim, outer shoes secured thereto each having end flanges, a slotted connecting web and side flanges extending above the web, said flanges and web forming a guide for the corresponding inner shoe, inner shoes movable within said guides, a projection on each inner shoe extending through the slot of the web, springs between said projections and the end flanges of the outer shoes, a hub, and spokes connected with the inner shoes and the hub.

10. A vehicle wheel comprising an outer rim, an inner rim comprising side flanges and a connecting web partially cut away, shoes secured to the outer rim and confined between the side flanges of the inner rim, inner shoes slidable longitudinally along the outer shoes, the cut away part of the web of the inner rim overhanging both the inner and outer shoes a flexible connection between the two shoes of a pair, a hub, and spokes connected with the hub and the inner shoes.

11. A vehicle wheel comprising an outer rim, a tire secured thereto, an inner rim comprising side flanges and a connecting web partially cut away, outer shoes secured to the outer rim each having end flanges, a slotted connecting web and side flanges extending above the web, said side flanges and web forming a guide for the corresponding inner shoe, inner shoes movable within said guides, a projection on each inner shoe extending through the slot of the web, springs between said projections and the end flanges of the outer shoes, the cut away part of the web of the inner rim overhanging and engaging both the inner and outer shoes, tubular arms on the inner shoes extending through the cut away parts of the web of the inner rim, a hub, tubular spokes secured to the hub and slidable radially upon said tubular arms, and springs within the tubular spokes confined between the hub and the inner shoes.

12. A vehicle wheel comprising a hub, spokes, a hollow rim comprising an inner rim member formed of side flanges and a web, having cut-away portions, connecting the inner ends of the side flanges, and an outer rim member in fixed relation with the inner rim member, shoes slidable circumferentially within the hollow rim and upon the web of the inner rim member and having means, extending through the cut-away portions of the web, connecting the rim with the spokes, and means within the hollow rim yieldingly resisting the circumferential movements of the shoes, the cut away portions of the web being of sufficient length to permit the circumferential movement of the shoes, restrained only by the yieldingly resisting means within the rim.

In testimony of which invention, I have hereunto set my hand, at Philadelphia, on this 9th day of February, 1906.

JOHN SINNOTT.

Witnesses:
M. M. HAMILTON,
THORNLEY B. WOOD.